(12) United States Patent
McKinzie et al.

(10) Patent No.: US 10,041,549 B2
(45) Date of Patent: Aug. 7, 2018

(54) DISK PACK COOLING ARRANGEMENT

(71) Applicant: Deere & Company, Moline, IL (US)

(72) Inventors: Kyle K. McKinzie, Altamont, KS (US); Steven R. Fliearman, Coffeyville, KS (US); Douglas K. Brownell, Bartlesville, OK (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 15/220,289

(22) Filed: Jul. 26, 2016

(65) Prior Publication Data
US 2018/0031051 A1    Feb. 1, 2018

Related U.S. Application Data

(63) Continuation-in-part of application No. 14/997,923, filed on Jan. 18, 2016.

(51) Int. Cl.
*F16D 13/72* (2006.01)
*F16D 13/52* (2006.01)
*F16D 13/58* (2006.01)

(52) U.S. Cl.
CPC ............. *F16D 13/72* (2013.01); *F16D 13/52* (2013.01); *F16D 13/58* (2013.01)

(58) Field of Classification Search
CPC .... F16D 25/0638; F16D 25/123; F16D 13/52; F16D 13/54; F16D 13/58; F16D 13/683; F16D 13/69; F16D 13/72; F16D 13/74; F16D 55/40; F16D 2055/007; F16D 65/78; F16D 65/84; F16D 65/128; F16D 65/853
See application file for complete search history.

(56) References Cited

U.S. PATENT DOCUMENTS

| | | | | |
|---|---|---|---|---|
| 2,241,241 A | * | 5/1941 | Clouse | F16D 13/72 188/369 |
| 2,481,834 A | * | 9/1949 | Foster | F16D 13/52 188/369 |
| 2,518,016 A | * | 8/1950 | Johnson | F16D 55/40 188/151 R |

(Continued)

OTHER PUBLICATIONS

Douglas K. Brownell, et al, Utility U.S. Appl. No. 14/997,923, filed Jan. 18, 2016.

(Continued)

*Primary Examiner* — Ramya P Burgess
*Assistant Examiner* — David R Morris
(74) *Attorney, Agent, or Firm* — Klintworth & Rozenblat IP LLP; Steven Wietrzny

(57) ABSTRACT

A disk pack cooling arrangement has a disk pack with alternating first and second plates in which one or more first plates are configured to couple to a first machine component and one or more second plates are configured to couple to a second machine component that is rotatable with respect to the first machine component. Each first plate is of a radial dimension less than each second plate so that one or more annular channels exist radially outward of each first plate. One or more annular springs are disposed in an associated annular channel. Each spring is configured to apply a separating force to at least one second plate and to form one or more flow channels for cooling fluid to reach each first plate from an associated annular channel.

20 Claims, 5 Drawing Sheets

(56) References Cited

U.S. PATENT DOCUMENTS

| | | | | |
|---|---|---|---|---|
| 3,157,257 | A | * 11/1964 | Root | ................ F16D 67/04 |
| | | | | 188/152 |
| 4,261,455 | A | 4/1981 | Uitenbroek et al. | |
| 4,446,953 | A | 5/1984 | Voss et al. | |
| 4,977,991 | A | * 12/1990 | Mahoney | ................ F16D 13/56 |
| | | | | 192/70.19 |
| 5,934,435 | A | 8/1999 | Bauer | |
| 6,427,820 | B1 | * 8/2002 | Korner | ................ F16H 57/02 |
| | | | | 192/109 R |
| 7,308,977 | B2 | * 12/2007 | Maguire | ............... F16D 65/853 |
| | | | | 192/113.35 |
| 8,087,506 | B2 | * 1/2012 | Haupt | ................ F16D 65/853 |
| | | | | 188/264 E |
| 2002/0162721 | A1 | 11/2002 | Savoyard et al. | |
| 2017/0204962 | A1 | * 7/2017 | Brownell | ............ F16H 57/0412 |

OTHER PUBLICATIONS

German Patent and Trade Mark Office, Search Report for German Patent Application No. 10 2016 225 905.9 dated Mar. 8, 2018.

\* cited by examiner

DISK PACK COOLING ARRANGEMENT

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to a disk pack arrangement configured to facilitate cooling fluid flow therethrough.

BACKGROUND OF THE DISCLOSURE

Transmission assemblies of various kinds for various work vehicles may include gears and associated components arranged to contact a fluid to dissipate heat and ease engagement of mating parts. Cooling is particularly important for certain heat-producing components (e.g., brakes, clutch packs and the like). Such transmission components (and others) may be configured or located (e.g., nested within other components) such that it may be difficult to adequately deliver the cooling fluid thereto. The tight packaging of one or more gear sets within the transmission may also inhibit cooling fluid from being routed to such heat-producing components.

SUMMARY OF THE DISCLOSURE

This disclosure provides a disk pack arrangement for improved cooling fluid flow to heat-producing components of the disk pack.

In one aspect the disclosure provides a disk pack cooling arrangement that has a disk pack with alternating first and second plates in which one or more first plates are configured to couple to a first machine component and one or more second plates are configured to couple to a second machine component that is rotatable with respect to the first machine component. Each first plate is of a radial dimension less than each second plate so that one or more annular channels exist radially outward of each first plate. One or more annular springs are disposed in an associated annular channel. Each spring is configured to apply a separating force to at least one second plate and to form one or more flow channels for cooling fluid to reach each first plate from an associated annular channel.

In another aspect the disclosure provides a disk pack cooling arrangement that has a disk pack with alternating friction disks and separator plates in which the friction disks are configured to couple to a rotating member extending along a rotation axis and are of a radial dimension less than the separator plates to form a plurality of annular channels radially outward of the friction disks. A plurality of annular springs is disposed about an associated friction disk in an associated annular channel. The springs are configured to apply a separating force to the separator plates and to form flow channels for cooling fluid to reach the friction disks from the annular channels.

In still another aspect the disclosure provides a transmission assembly including a housing with one or more walls at least in part defining an internal cavity containing a rotating member and defining one or more coolant passages. At least one disk pack is disposed within the internal cavity of the housing. The at least one disk pack having a set of friction disks and a set of separator plates interleaved with the set of friction disks. The friction disks are coupled to the rotating member and the separator plates are coupled to the housing. The friction disks are of a radial dimension less than the separator disks to form a plurality of annular channels radially outward of the friction disks. Annular springs are disposed about an associated friction disk in an associated annular channel. The springs are configured to apply a separating force to the separator plates and to form flow channels for cooling fluid to reach the friction disks through the annular channels from the one or more coolant passages.

The details of one or more implementations or embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
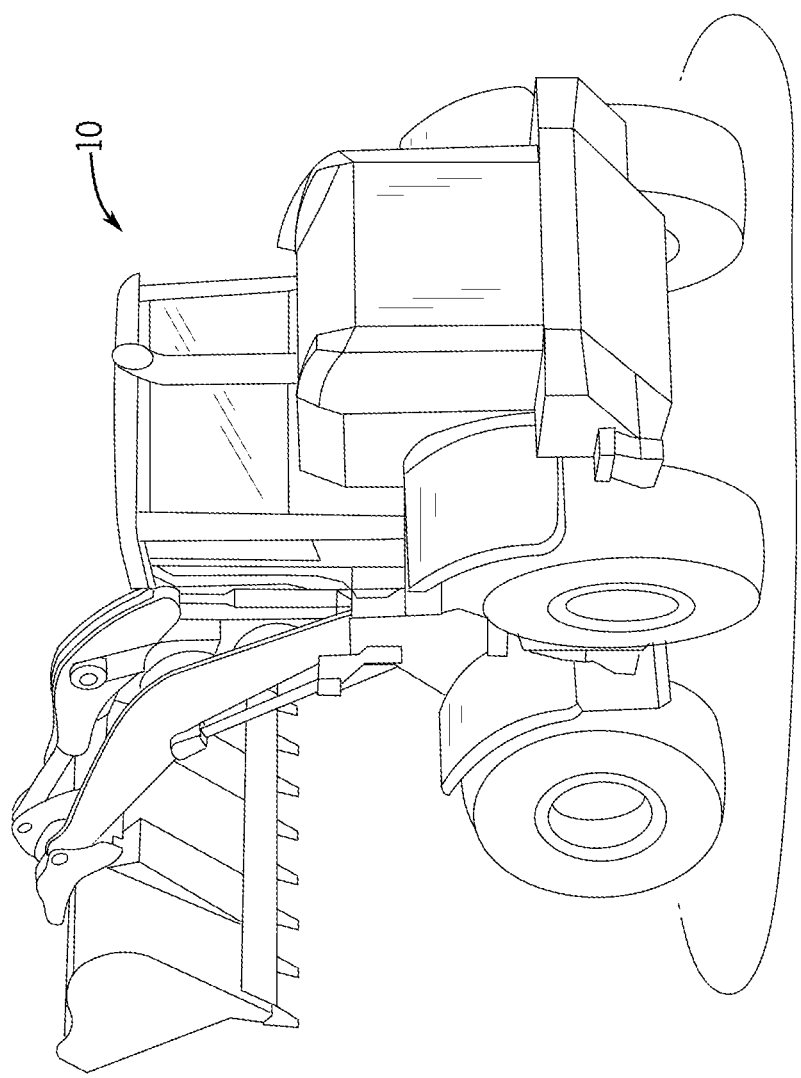
FIG. 1 is an isometric view of an example work vehicle having an example transmission arrangement as illustrated in accordance with an example embodiment of this disclosure.

The following describes one or more example embodiments of the disclosed disk pack cooling arrangement, as shown in the accompanying figures of the drawings described briefly above. Various modifications to the example embodiments may be contemplated by one of skill in the art.

As used herein, the term "axial" refers to a direction that is generally parallel to an axis of rotation, axis of symmetry, or centerline of a component or components. For example, in a cylinder with a centerline and opposite, circular ends, the "axial" direction may refer to the direction that generally extends in parallel to the centerline between the opposite ends. In certain instances, the term "axial" may be utilized with respect to components that are not cylindrical (or otherwise radially symmetric). For example, the "axial" direction for a rectangular housing containing a rotating shaft may be viewed as a direction that is generally in parallel with the rotational axis of the shaft. Furthermore, the term "radially" as used herein may refer to a direction or a relationship of components with respect to a line extending perpendicularly outward from a shared center line, axis, or similar reference. For example, two concentric and axially overlapping cylindrical components may be viewed as "radially" aligned over the portions of the components that axially overlap, but not "radially" aligned over the portions of the components that do not axially overlap. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominately in the respective nominal axial or radial direction.

Additionally, the term "annular" (and derivatives) are used herein to refer to the radial sides or surfaces of an annulus, for example, the outward and inward facing sides or surfaces of an annular body. In the case of an annular body that is symmetric about a central reference axis or centerline, these annular sides and surfaces may correspond with circumferential sides or surfaces thereof, which may also be considered the inner and outer diameter sides or surfaces.

The following describes a cooling arrangement that is well-suited for use within a transmission arrangement, for example, containing a planetary gear train, such as a planetary transmission in the drivetrain of a work vehicle. The cooling arrangement includes one or more coolant flow passages, which are strategically routed through the transmission housing to provide coolant to heat-generating components of the transmission.

In certain embodiments, the cooling arrangement may have the coolant flow passages arranged so that flow outlets are arranged vertically above, or overhead of, the heat-generating components that are targeted to be cooled, for example, annular disk packs of a planetary set, and provide a shower, mist or spray of coolant that falls down upon these components, which may otherwise be difficult to supply with coolant flow. In certain embodiments, the cooling arrangement includes one or more spray plates located at the coolant flow passages to alter the outlet flow thereof. The spray plates have one or more through openings to separate and disperse the coolant into separate flow streams. The dispersed flow streams effectively widen the spray pattern of the coolant in the manner of a showerhead. In certain embodiments, the spray plates may be perforated disks. The perforated disks may be mounted to the housing within the coolant flow passages using various mechanical connecting features. For example, the perforated disks may be mounted, in part, by a plug that connects directly to the housing (e.g., by mating threads).

In certain embodiments, the component to be cooled is a disk pack having interleaved plates, such as friction plates interleaved with separator plates. The plates may be in the form of disks, and one set of disks, such as the friction disks, may have a smaller diameter than the other (e.g., separator) disks. Annular channels are formed radially outward of the friction disks between each pair of consecutive separator disks in which springs are disposed. The springs act against the separator disks to forcibly separate the separator disks axially from the friction disks until the spring force is overcome during energization of the disk pack, thus forming what may be known to those of skill in the art as a "force-separated" disk pack. Cooling fluid may thus be directed into the channels (moving around the springs as needed) and between the separator disks and the friction disks. During periods when the disk pack is not engaged, cooling fluid may pass along the radial faces of the friction disks and the separator disks. Even when the disk pack is engaged, cooling fluid may contact a portion of the radial faces of the separator disks as well as the edges of the friction disks. In so doing, the cooling of the disk pack is enhanced, and thereby may improve the thermal performance of the planetary transmission, while promoting the thorough distribution of lubricating coolant to minimize wear and prolong the operational lifespan of the transmission components.

In certain embodiments, the springs may be wave or Belleville type springs having radially inner and outer peripheries and bodies that vary in the axial dimension so as to fit within the space between consecutive separator disks. The springs may be constrained at only one or more discrete portions of their outer peripheries, thereby leaving open areas, in some cases a majority or even substantially all of the outer periphery, to allow coolant to pass into the disk pack from radially outside of the disk pack. Moreover, the springs may be located in the radial dimension so as to be spaced apart (radially and otherwise) from the friction disks, which may in some cases may rotate continuously regardless of the operational state of the disk pack. The springs may be located in this spaced orientation by one or more rods, pins, bolts, dowels, sleeves, collars or like mechanical members that span the gaps between the separator plates. In some cases, these mechanical fixing members may mount directly to backer plates, for example, within openings in the bodies or other features (e.g., ears or tabs) thereof. Further, the mechanical fixing members may be located to center or substantially center the springs with the rotation axis of the friction disks.

Referring now to the drawings, an example embodiment of the disclosure will be described in detail. FIG. 1 shows an example wheeled loader 10 containing a planetary transmission in which embodiments of the cooling arrangement are usefully included. A wheeled loader 10 is provided by way of contextual example only. It will be appreciated that embodiments of the cooling arrangement described herein are not restricted to usage in any particular planetary gear set, planetary transmission, or type of vehicle or platform, including other work vehicles used in the agriculture, construction and forestry industries. Embodiments of the cooling arrangement may be beneficially utilized within the planetary transmission of a work vehicle, such as the wheeled loader 10, as such transmissions may require relatively robust cooling and lubrication systems. Further, the planetary transmissions of work vehicles commonly contain certain components (e.g., clutch and brake packs) that are positioned around or otherwise located proximate a planetary gear set, that are prone to the generation of heat during operation of the transmission, and that have traditionally been challenging to supply with active coolant flow during operation of the planetary transmission.

Figure 2:
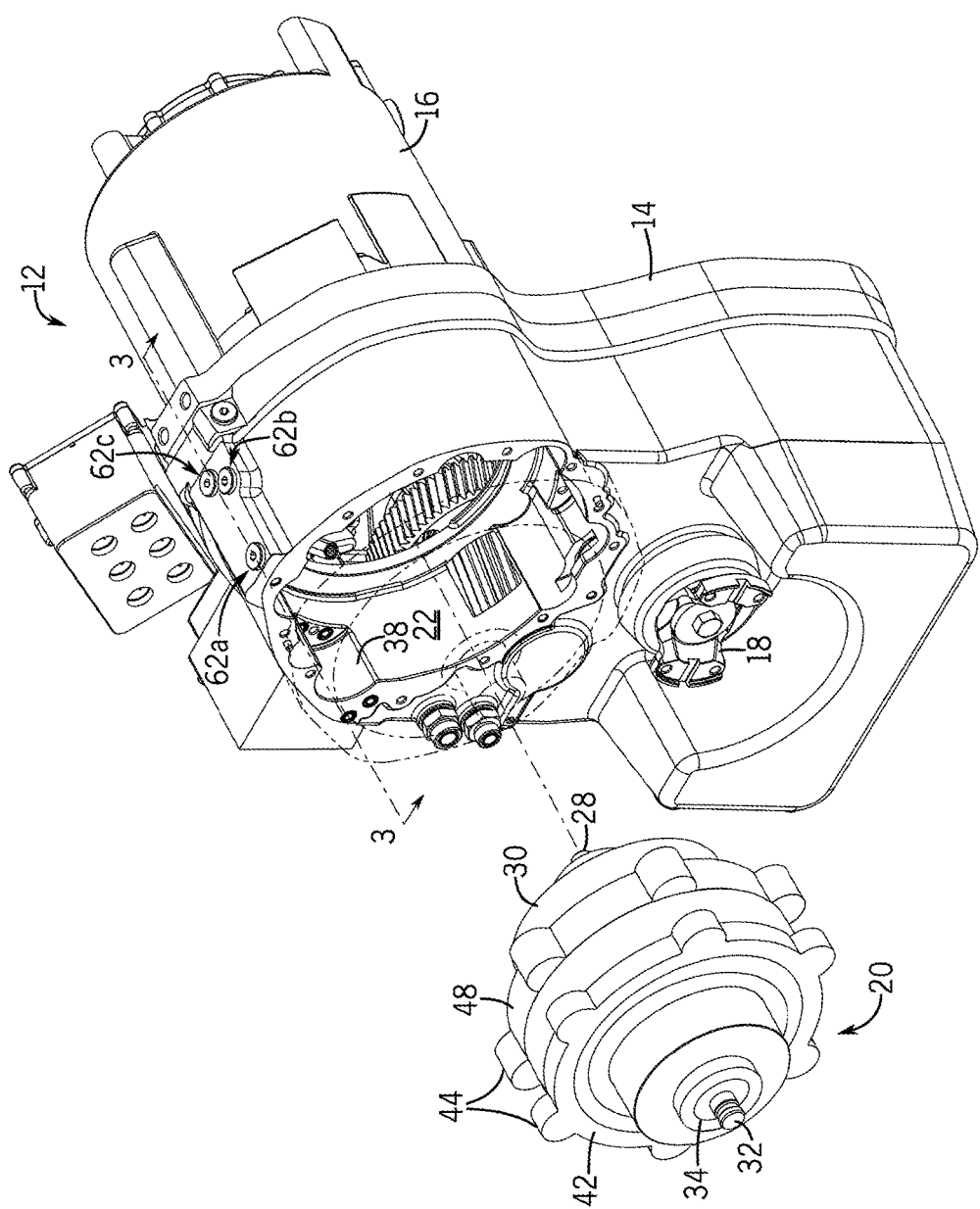
FIG. 2 is an isometric view of the example transmission of the work vehicle of FIG. 1.
Figure 3:
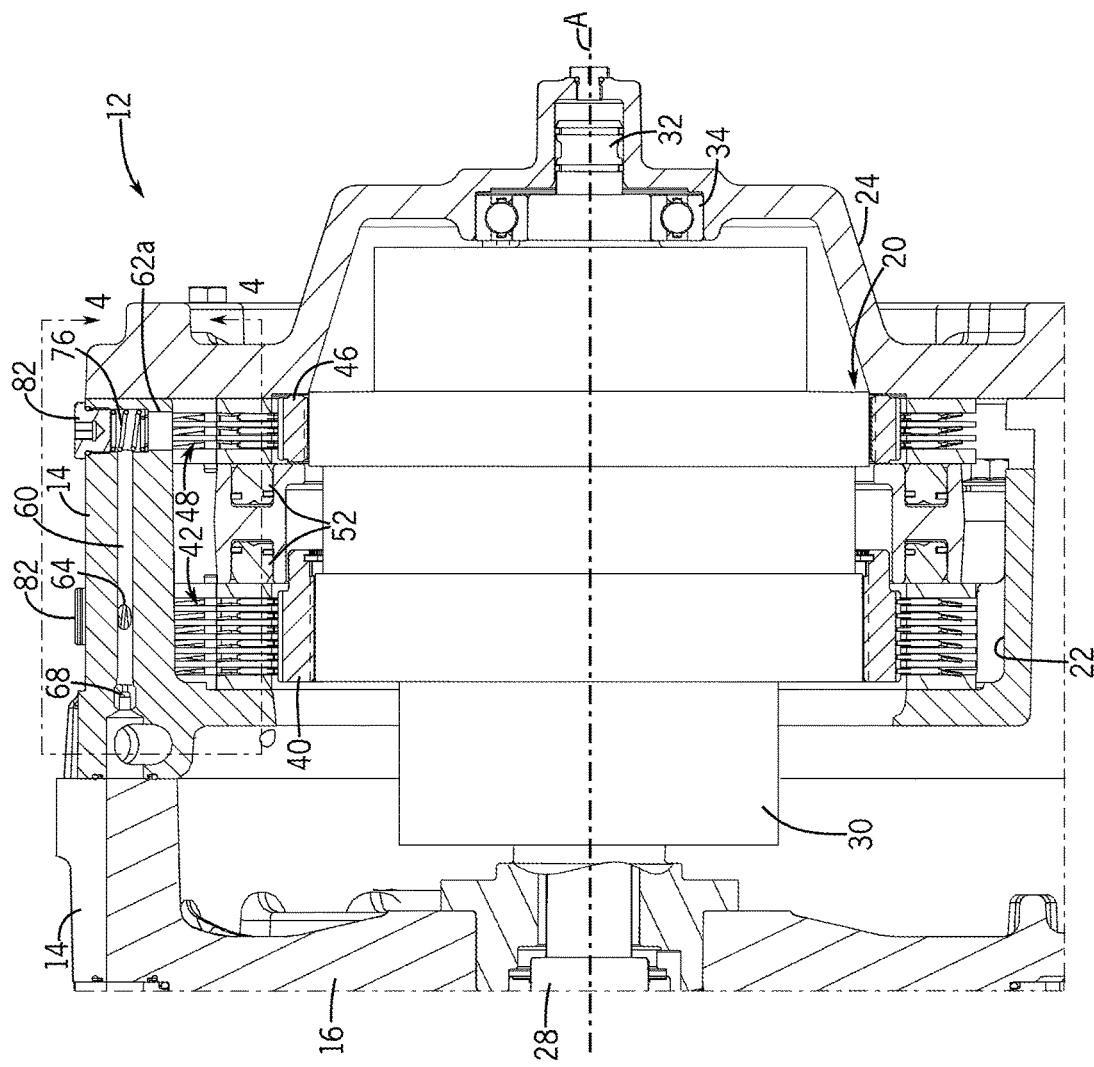
FIG. 3 is a cross-sectional view of the example transmission as taken along line 3-3 of FIG. 2, showing an example cooling arrangement.

FIGS. 2 and 3 show an example planetary transmission 12 that may be included in the wheeled loader 10. In this particular example, the planetary transmission 12 may be a 3-speed power shift transmission; however, the particular type, construction, and functionality of the planetary transmission 12 is largely incidental and will only be described briefly herein. Generally, the planetary transmission 12 includes a housing 14, a drive motor 16 supported by the housing 14, and a first output shaft 18. Although not shown in FIGS. 2 and 3, the planetary transmission 12 may also include a second output shaft, which may be the same the output shaft 18, but which extends from the opposite side of the housing 14. A gear train may be contained within the planetary transmission 12 that mechanically links the drive motor 16 to the output shafts 18. As may be seen in FIG. 3, the gear train may include a planetary gear module or "planetary gear set 20." The planetary gear set 20 is matingly received within a compartment or chamber 22, and enclosed by a cover 24 attached to the housing 14, for example, by a plurality of bolts or other such fasteners. The planetary gear set 20 may include an input gear 28 and an output gear 30, which may be spur and helical gears, respectively. The input gear 28 engages the drive shaft of the drive motor 16, while the output gear 30 engages additional gearing within the planetary transmission 12 linking the planetary gear set 20 to the output shafts 18. The input gear 28 of the planetary gear set 20 is fixedly joined to a central shaft 32, which extends longitudinally through the planetary gear set 20. As may be seen in FIG. 3, a rolling element (e.g., ball) bearing 34 may be disposed around the opposing terminal end of the shaft 32 and received within an annulus provided in the cover 24. The shaft 32 may be fixedly connected to a sun gear (not shown) that engages a number of planet gears (not shown) that are supported by a planet carrier (not shown) and that engage a ring gear 40 that circumscribes the planet carrier and splines to a first disk pack 42, which may serve as a first range brake pack for the transmission.

The planetary gear set 20 may include numerous other components that may vary amongst embodiments and that will not be described in detail herein. It is noted briefly, however, that such components may include an additional carrier and supported planetary gears, an additional ring 46, one or more additional multi-lobed disk packs (one of which is identified in FIGS. 3-5 by reference numeral "48" and another of which is within the interior of the planetary gear set 20), various housing elements, fasteners, and rolling element (e.g., ball and/or roller) bearings. Additionally, further embodiments of the planetary gear set 20 and, more generally, the planetary transmission 12 may include various other coolant distribution features, such as shaft-driven pumps, plumbing, and the like.

The ring gear 40 may spline to a first disk pack 42, which may serve as a first range (e.g., low range) brake pack for the transmission, and the second disk pack 48 may serve as a second range (e.g., mid or high range) brake pack for the transmission. The construction of the disk packs 42, 48 may vary amongst embodiments. However, by way of example as detailed below, the disk packs 42, 48 may each include relatively thick backer plates 42a, 48a, relatively thin separator plates 42b, 48b positioned between the backer plates 42a, 48a, friction disks 42c, 48c interleaved with the separator plates 42b, 48b, and springs 50 biasing the separator plates 42b, 48b and friction disks 42c, 48c toward a non-contacting position, respectively. The ring gear 40 may have a splined outer circumferential surface that engages the friction disks 42c of the disk pack 42 in a rotationally fixed relationship such that the ring gear 40 and the friction disks 42c of the disk pack 42 co-rotate when the planetary gear set 20 is driven. A similar arrangement may be provided for the ring gear 46 and disk pack 48, for example. For both disk packs 42, 48, the backer 42a, 48a and separator 42b, 48b plates may be joined in a stacked configuration by a number of fasteners and include radial projections or lobes 44, which engage corresponding recesses 38 provided in the chamber 22. During operation of the planetary transmission 12, hydraulically-actuated annular pistons 52 may selectively exert an axially-compressive force across the disk packs 42, 48 to slow or stop the rotation of the friction disks and, therefore, the rotation of the ring gears 40, 46.

The disk packs 42, 48 may generate a considerable amount of heat when utilized to slow or stop the rotation of elements of the planetary gear set 20. Even when one or more of the disk packs 42, 48 are disengaged, excess heat may be generated by friction between the separator plates 42b, 48b and the rapidly rotating friction disks 42c, 48c of the respective disk pack 42, 48. It is thus desirable to dissipate such excess heat by contacting the disk packs 42, 48 with an active flow of liquid coolant, such as a suitable oil. However, due to the relatively tight packaging of the transmission components, it may be difficult or impractical to deliver sufficient coolant flow to the interior of the disk pack 42, 48 or other internal components.

For this reason, a cooling arrangement is provided with one or more coolant flow passages and certain other features, which promote the flow and dispersion of oil or another coolant to a desired discharge area, such as the outer annular or circumferential surfaces of the disk packs 42, 48. By virtue of this design, the cooling arrangement may continuously deliver a dispersed coolant flow into the interior of the disk packs 42, 48 for improved heat dissipation. Additionally, in embodiments wherein the coolant is oil or another liquid having lubricating properties, the coolant may further lubricate the disk packs 42, 48 to reduce heat-generating friction, to minimize wear of the component of friction disk pack 42, 48 and to prolong the serviceable lifespan thereof.

An example cooling arrangement will now be described in detail in the context of the example planetary transmission 12 illustrated, and in particular an example overhead spray arrangement will be described which may be employed to deliver coolant to the disk packs 42, 48 in order to practice the disclosure. It will be understood, however, that coolant may be brought to the force-separated disk pack arrangement of this disclosure in any suitable manner.

Figure 4:
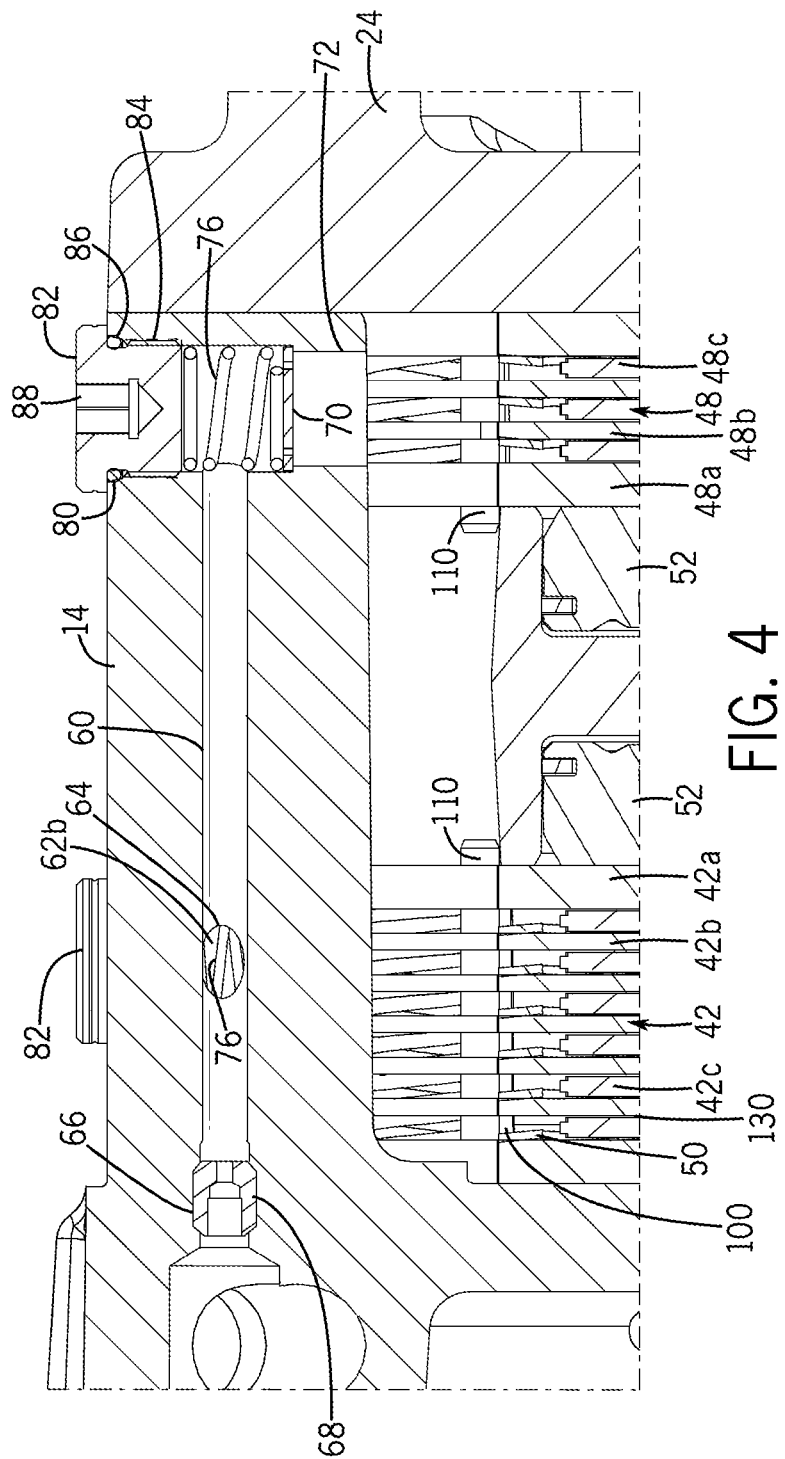
FIG. 4 is an enlarged cross-sectional detail view of the area 4-4 of FIG. 3.
Figure 5:
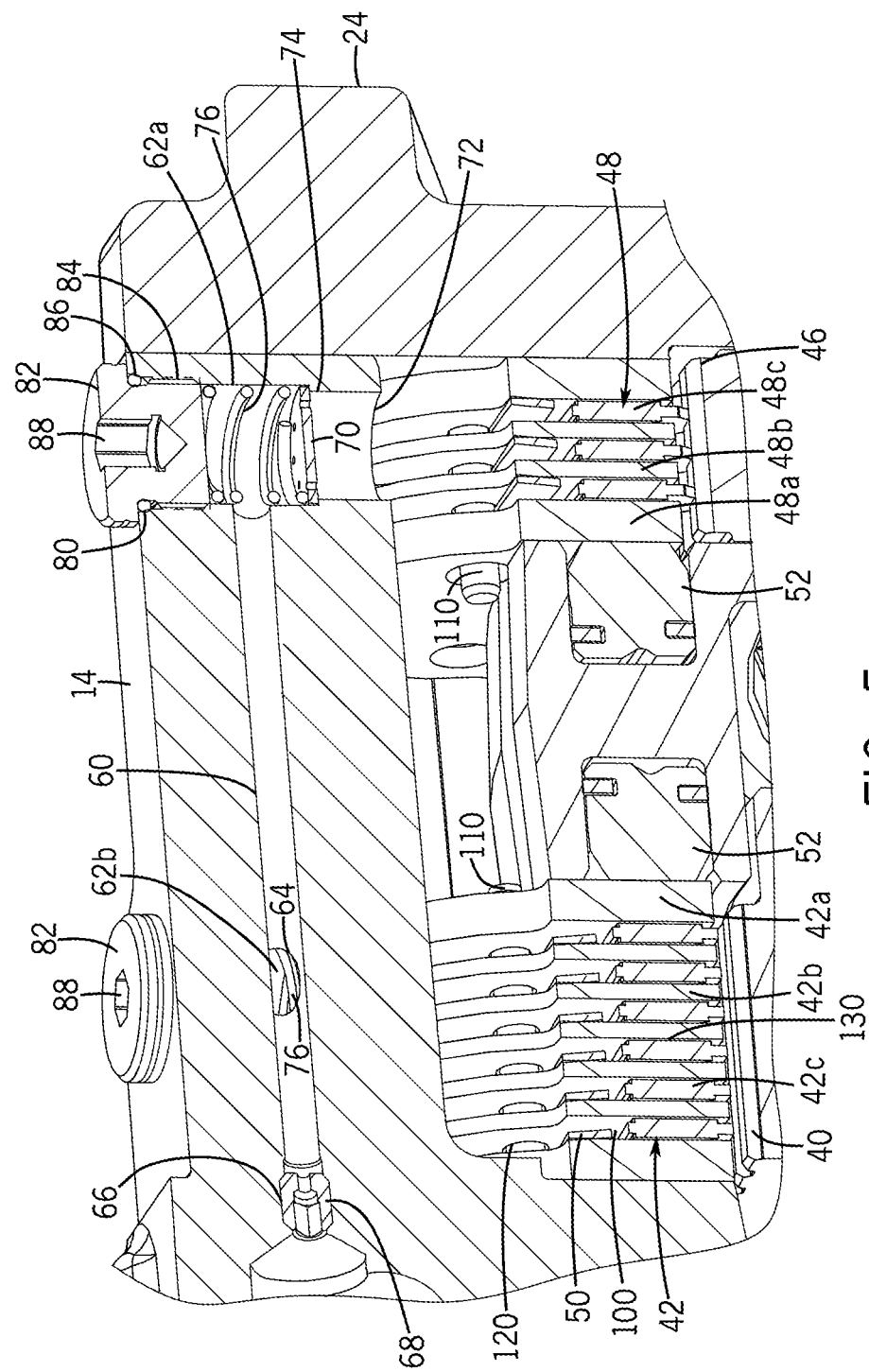
FIG. 5 is an isometric view thereof.

Referring also to FIGS. 4 and 5, the housing 14 may be configured with coolant passages, including one or more axial passageways 60 generally parallel to a reference axis "A" (e.g., the axis of rotation of the input gear 28) of the planetary gear set 20, and one or more radial passageways, which intersect the axial passageway(s) 60. In the illustrated example, there is a single axial passageway 60 and three radial passageways 62a, 62b, 62c (indicated generally in FIG. 2) arranged to intersect the axial passageway 60 in order to provide fluid communication therebetween. In this case, the axial passageway 60 is configured to terminate at radial passageway 62a with center axes of the axial 60 and radial 62a passageways intersecting. The radial passageways 62b, 62c are configured to intersect the axial passageway 60 at different locations along its length. Center axes of the radial passageways 62b, 62c do not intersect the center axis of the axial passageway 60, but rather are spaced apart on transverse "sides" of the axial passageway axis. As a result, the openings 64 (one shown in FIGS. 4 and 5) between the circular cross-sectioned axial 60 and radial 62b, 62c passageways are oblong.

In addition, in the illustrated example, the cooling passages are located in a portion of the housing 14 such that, when mounted in the wheeled loader 10, the planetary transmission 12 is maintained in a vertical orientation (as shown in FIG. 2) in which the cooling passages are vertically above the planetary gear set 20, and thus above the heat-generating components targeted for cooling. Still further, in the illustrated example, the radial passageways 62a-62c may generally be oriented along axes that are normal to the horizon, again when the planetary transmission 12 is mounted to the wheeled loader 10 and when the wheeled loader 10 is on generally flat, even terrain. Thus, the cooling arrangement provides overhead spray of the coolant onto the transmission components targeted for cooling (e.g., friction disk packs and the like).

Other configurations for routing the coolant are possible, including, for example, using a dedicated axial passageway for each radial passageway and using one or more passageways that are obliquely oriented with respect to the reference axis A of the planetary gear set 20. Moreover, the coolant is shown and described as being routed through internal passageways in one or more walls making up the housing 14 of the planetary transmission 12. However, other means of routing the coolant could be used, including passageways at the interior or exterior of the housing 14, either formed internal to other interior or exterior walls, or in separate conduit members (e.g., rigid or flexible hoses, tubes, pipes or the like) arranged to communicate coolant within or into the housing 14 as needed to impinge upon components of the planetary gear set 20 mounted within the housing 14.

The axial passageway 60 communicates coolant from other upstream areas within the housing 14, such as in or near the drive motor 16, and delivers the coolant to each radial passageway 62a-62c. In the illustrated example, the sectional flow area upstream of the axial passageway is greater than the sectional flow area of the axial passageway 60. The sectional flow area of each of the radial passageways 62a-62c is also greater than that of the axial passageway 60. The flow of coolant reaching the targeted components of the planetary gear set 20 may be selectively controlled by appropriate sizing of the flow areas of the coolant passage (e.g., axial passageway 60 and/or radial passageways 62a-62c). Alternatively or additionally, an interchangeable component may be used for flow control. For example, in the illustrated example, at the leading or upstream end of the axial passageway 60 is a transition area 66 which necks down to the axial passageway 60 but has a larger diameter in which a flow orifice insert 68 may be mounted (e.g., by threaded engagement, press-fit or other mechanical means). A flow orifice insert 68 of one orifice dimension may be removed and replaced with a different flow orifice insert of a different orifice dimension, as needed for a desired coolant flow volume and/or flow rate. In certain applications, the flow characteristics of the coolant passage without the flow orifice insert 68 installed may be desired, such that the flow orifice insert 68 may be removed and not replaced.

At the downstream side of the coolant passage is one or more spray plates that effect a change in the exiting coolant flow prior to impinging upon the components of the planetary gear set 20 to be cooled. In the illustrated example, a discrete spray plate is provided at each outlet of the coolant passage. More specifically, the example construction has spray plates, in the form of disks, mounted at or near the outlet of each the radial passageway 62a-62c. In particular, each spray disk 70 is mounted inside the associated radial passageway 62a-62c inset from an outlet opening 72. The spray disks 70 may be mounted in various manners, including by permanent or semi-permanent attachment techniques (e.g., welding, press-fit, shrink-fit, adhesives or other bonding or welding processes). Removable mounting techniques may also be used, such as mating threads and the like. In the illustrated example, the spray disks 70 are each mounted onto a circular shoulder 74 and are held in place by a retainer 76. No additional mechanical connection is made.

The retainers 76 may be any suitable component that can apply a counterforce acting on the spray disks 70 in the direction toward the shoulders 74 as well as allow flow to pass from the axial passageway 60 through the radial passageways 62a-62c to the outlet openings 72. In the illustrated example, the retainers 76 are springs. The springs provide biasing force acting on the spray disks 70 by compression of the springs. The springs are selected so that in use they are not in a fully compressed, or fixed length, state, that is, so that spacing exists between the coils of the spring. In this way, coolant may flow through the spacing of the spring from the axial passageway 60 to the outlet openings 72 of the radial passageways 62a-62c. As noted, other components may be used for the retainers 76. For example, rather than a spring, a fixed length member, such as a spacer, may be used. The spacer may be a sleeve, for example, providing a hollow core with one or more openings in the wall so the sleeve allow flow to pass between the axial 60 and radial passageways 62a-62c. Solid core spacer elements may also be used provided they including the necessary porting.

The end of each retainer 76 opposite the associated spray disk 70 may contact, and press against in the case of a spring retainer, a wall of the housing 14 or other wall which forms a closed end of each radial passageway 62a-62c opposite the respective outlet opening 72. Alternatively, the radial passageways 62a-62c may be open-ended, each forming an access port 80 opposite the outlet opening 72. Each access port 80 may be closed by a plug 82. The plugs 82 may be permanently mounted once assembly of the retainers 76 and spray disks 70 are installed. However, removably mounting the plugs 82, for example via a threaded connection 84, allows the retainers 76 and spray disks 70 to be accessed after initial installation. This allows the retainers 76 and the spray disks to be inspected, maintained or replaced as needed. More aptly, removable plugs 82 allow the spray disks 70 to be interchanged with spray disks having different perforation patterns, as discussed further below. The access ports 80 may be useful for visual inspection or physical access to the coolant or to adjacent components of the planetary gear set 20 (or other elements of the planetary transmission 12). To reduce or prevent leakage, O-rings 86 (or other seals, gaskets or sealing compounds) may be placed around the plugs 82 underneath the enlarged heads of the plugs 82 to seal against the access ports 80. Each plug head may further have a tool receptor 88 (e.g., a hex opening) at its center or at its outer periphery that may be engaged by a tool (e.g., driver, wrench, etc.) to apply sufficient torque to the plugs 82.

The spray disks 70 themselves may be identical or near identical, for example, in terms of material, diameter, thickness and perforation pattern, or they may differ in one or more respects. The spray disks 70 are substantially the same in the illustrated example. By way of non-limiting example, the spray disks 70 may be a blank metal disk of a common sheet metal gauge, such as 16-gauge steel sheet metal (approximately 1.5 mm thick). The spray disks 70 have one or more through openings therein, which may be formed in any known technique. For example, the spray disks 70 may be laser cut and define a uniform pattern of spaced apart perforations of any suitable size, for example approximately 1-2 mm in diameter. The spray disks 70 alter the outflow of coolant from the coolant passage, specifically, from the outlet openings 72 of the radial passageways 62a-62c. In the illustrated example, the uniform perforation pattern provides a plurality of narrowed flow streams that are separated and dispersed to effectively widen the spray of the coolant exiting each of the radial passageways 62a-62c, providing a shower of coolant that may increase the penetration and coverage area reached by the coolant. Separating and dispersing the spray pattern also increases the surface area of the coolant, which may enhance the cooling heat transfer. The resulting effect of the spray disks 70 is thus to increase the area or elements of the planetary gear set 20 contacted by the coolant, and thus the cooling capacity of the coolant.

The non-permanent, removable mounting of the spray disks 70 allows them to be replaced with spray disks providing a different, common spray pattern in all three radial passageways 62a-62c. Alternatively, a mixture of spray disks may be used to provide varied spray patterns across the passageways 62a-62c. The spray pattern utilized may vary and be selected to optimize the coverage and penetration of the coolant for a given area or component targeted for cooling. For example, if coolant penetration is critical (e.g., to cool deep into densely packed components), then a spray disk that provides a narrow, focused spray pattern may be desired, whereas if breadth of coverage is important (e.g., to cool the exposed surface of a large component or assembly), then a spray disk that provides a widely dispersed or diffused spray pattern may be desired. Various spray patterns providing a combination of penetration and coverage to a greater or lesser extent may be used. Moreover, not only may the pattern (i.e., count, size, spacing, arrangement, etc.) of like perforations (e.g., spaced apart circular openings) differ to change the spray pattern, but perforations of different configurations may be used. For example, the spray disks may have one or more relatively long and narrow slits may be to effect one or more thing ribbons of coolant. The spray disks may have also have perforations of geometric, spiral and other configurations. The quantity and spatial arrangement of the spray disks and radial passageways may also vary depending on the application.

During operation of the planetary transmission 12, the cooling arrangement will provide pressurized coolant flow to targeting heat-generating components of the planetary gear set 20, including both the of the friction disk packs 42, 48. The location and orientation of the coolant passages, specifically the radial passageways 62a-62c being vertical above the friction disk packs 42, 48 and being oriented so that the outlet openings 72 opening in a downwardly orientation, allows coolant to be distributed (e.g., showered) onto the friction disk packs 42, 48 aided by gravity. This, and the separated and dispersed spray pattern, allows the coolant to cover and penetrate in between the individual disks of the disk packs 42, 48. The coolant contacting the disk packs 42, 48 conductively removes excess heat from the disk packs 42, 48 to provide the desired heat dissipation and improve the overall thermal performance of the planetary transmission 12. The coolant arrangement may further discharge coolant directly or indirectly onto other components of the planetary gear set 20, such as at the interfaces between the ring gears 40, 46 and the disk packs 42, 48. This, in turn, may further minimize frictional heating and reduce component wear in embodiments in which oil or another lubricating liquid is used as the coolant.

Having described an example overhead spray coolant delivery arrangement, an example force-separated disk pack arrangement according to this disclosure will now be described. For simplicity, the following discussion will reference only the disk pack 42. It will be understood, however, that the disk pack 48 may be constructed in the same or like manner, albeit the disk pack 48 is shown with fewer components (e.g., 2 backer plates 48a, two separator plates 48b and three friction disks 48c). As mentioned above, and again referring again to FIGS. 4 and 5, the disk pack 42 includes a pair of backer plates 42a on each axial end of five separator plates 42b that are interleaved with six friction disks 42c. The friction disks 42c are splined or otherwise mounted to the ring gear 40, and thereby coupled to the input gear 28 and shaft 32, so as rotate therewith. The backer 42a and separator 42b plates on the other hand are coupled to the housing 14 or otherwise secured with respect to the planetary gear set 20 so as not to rotate with the ring gear 40/shaft 32.

The friction disks 42c may be monolithic or composite structures, having an axially enlarged (or widened) annular section at which friction-enhancing features are deposited, adhered, etched, mounted or otherwise attached to or formed in the friction disks 42c. The friction disks 42c are configured to have a lesser radial dimension (i.e., a lesser diameter) than the separator plates 42b such that an annular axial gap or channel 100 is formed between consecutive separator plates 42b radially outward of each friction disk 42c in which one of the springs 50 is disposed about the circumference of the associated friction disk 42c, as shown in FIG. 3. Thus, there are six springs 50 included in the disk pack 42 (and three in the disk pack 48). As noted, the springs may be annular wave or Belleville type springs having radially inner and outer peripheries (or diameters) with a body extending between the peripheries that has a varying axial dimension that spans the channel 100 in which it is disposed so as to contact the associated pair of consecutive separator plates 42b. The configuration of the springs 50 applies an axial force tending to bias the pair of consecutive separator plates 42b apart in the axial direction. The disk pack 42 is thus force-separated in that the separator plates 42b are driven axially apart from the friction disks 42c mechanically when the disk pack 42 is not engaged. When engaged, the disk pack 42 is driven to overcome the spring force (via hydraulic power applied to the pistons 52 acting against one of the backer plates 42a) to move the separator plates 42b axially into engagement with the friction disks 42c. When sufficiently energized, friction between the separator plates 42b and the friction disks 42c mechanically links the ring gear 40 to the housing 14, thereby preventing the ring gear 40 from rotating. As is understood, energizing the disk pack 42, and locking up the ring gear 40, in this manner will effect a change in the gear ratio of the planetary gear set 20. It should also be understood that in the illustrated example the disk pack 42 acts as a "brake." However, the disk pack 42 could also be configured as a clutch by coupling the ring gear 40 to another rotating component when energized.

Since the friction disks 42c spin continuously with the ring gear 40 relative to the separator 42b (and backer 42a) plates until the disk pack 42 is energized, the springs 50 are configured and arranged so as not to engage the friction disks 42, which reduces the losses due to drag or "tare" associated with the disk pack 42. In the illustrated embodiment, the springs 50 are positioned by locating pilot members 110 that contact the outer periphery of the springs 50. The pilot members 110 contact the springs 50 at one or more discrete locations about their outer peripheries without obstructing the coolant flow path to the disk pack 42 significantly. In the illustrated embodiment, there are six pilot members 110, which take the form of dowel pins. The dowel pins are spaced apart equi-anguarly about the reference axis A (e.g., one mounted at each of the lobes 44) and at a common radial distance from the reference axis A so as to center the springs 50 with respect to the reference axis A, and thereby the friction disks 42c, and the disk pack 42 itself. It should be noted that in the illustrated example, the input gear 28, the shaft 32 and the ring gear 40, and thereby the disk pack 42, are concentric about the reference axis A. However, in other configurations the disk pack 42 may be concentric about another axis other than that of the input gear 28 and shaft 32 (e.g., an offset gear or shaft concentric about an axis in parallel with the reference axis A).

The circumferential spacing between the dowel pins, and thus the annular path for coolant to flow to the disk pack 42, is nearly all, and in deed well over a majority of the circumference of the outer periphery of the springs 50, and in this case of the disk pack 42 itself. The dowel pins, in the illustrated example, are mounted to the ears or lobes 44 in the backer plates 42a, spanning the axial distance therebetween, with their ends fit into openings 120 in the lobes 44. In the brake configuration of the disk pack 42 shown in FIGS. 4 and 5, one backer plate 42a (at the left in the figures) may be fixed in place so as not to move relative to the housing 14, while the other backer plate 42a (to the right in the figures) may be permitted to move axially (to the left) when acted upon by the corresponding piston 52. Thus, for example, the dowel pins may be fixed at one end to the stationary backer plate, but allow for the moveable backer plate (and the separator plates 42b) to shift axially along the dowel pins slightly when the disk pack 42 is energized. The dowel pins may be sized to extend axially inwardly beyond the moveable backer plate (to the right of the disk pack 42 in FIGS. 4 and 5) when the disk pack 42 is in the non-energized stated shown in FIGS. 4 and 5. Additionally or alternatively, these ends of the dowel pins may have enlarged heads, cross-pins or other transversely extending members at the axially inner (or piston) side of the disk pack 42 that are sized larger than the openings 120 so as to tie the disk pack 42 together axially, while still allowing axial movement.

It should be noted that other configurations and arrangements may be utilized to locate the springs 50. For example, the pilot members 110 may be mechanical fixing members other than dowel pins, such as any suitable rods, pins, screws, bolts and the like. Large diameter slotted or perforated sleeves or collars may also be suitable alternatives. The number of pilot members 110 may also vary more or less, and in some cases a single pilot member may be sufficient. However, the quantity and configuration of the pilot members 110 should not impede coolant flow to the disk pack 42 by blocking significant portions of the circumference of the outer periphery of the springs 50 and the disk pack 42 itself. Moreover, the pilot members 110 may be secured in other ways, including being mounted to other components (e.g., the housing 14) and being mounted using other techniques and devices (e.g., threaded connection, heat-shrink, welding, and so on).

During operation of the transmission 12, and the example planetary gear set 20 illustrated, the disk pack 42 will be in a non-energized state until hydraulic pressure is applied to the pistons 52. In the non-energized state, as mentioned, the friction disks 42c will rotate with the ring gear 40 relative to the backer 42a and separator 42b plates as well as the springs 50, all of which will remain generally stationary relative to the housing 14, although some incidental (e.g., non-rotational) relative movement may occur. Keeping the spinning friction disks 42c mechanically isolated in this manner reduces frictional losses (e.g., drag, windage, tare) that may arise otherwise, which thereby improves the efficiency of the planetary gear set 20, and the transmission 12 as a whole. In the non-energized state coolant will pass into the disk pack 42 through the annular openings at the outer peripheries of the springs 50, and the disk pack 42 itself, and into the channels 100. Coolant will thus be allowed to pass along the radial faces of the separator plates 42b and into narrow axial gaps 130 between the separator plates 42b and the friction disks 42c, and thereby pass along the radial faces thereof, to cool the interleaved components when not engaged. When the disk pack 42 is energized, the narrow gaps 130 close as the radial faces of the friction disks 42c frictionally mesh with the separator plates 42b. Yet, since the channels 100 remain when the disk pack 42 is energized, albeit of slightly smaller axial dimension, coolant is allowed to bathe the springs 50 as well as the exposed portions of the radial faces of the separator plates 42b and the outer peripheral edges of the friction disks 42c. When the disk pack 42 is disengaged, the gaps 130 re-form and coolant is once again allowed to flow from the channels 100 and through the interleaved separator 42b (and backer 42a) plates and friction disks 42c and continue on through the cooling circuit. In this manner, heat is picked up by the coolant from the interleaved heat-producing members in both operational states of the disk pack 42. The improved thermal characteristics of the planetary gear set 20 afforded by this arrangement in turn improves the efficiency of the transmission 12.

There have thus been described embodiments of a cooling arrangement, which is advantageously utilized within a planetary gear set or a larger planetary transmission suitable for usage within a work vehicle. The cooling arrangement includes coolant flow passages, which may be configured (e.g., located and sized) to intake coolant and direct active coolant flow to nearby components of a transmission (e.g., surrounding disk packs) for purposes of enhanced heat dissipation and/or lubrication. The coolant flow passages have spray elements that effect an altered spray pattern to disperse the coolant and provide improved penetration and coverage of coolant to internal heat-generating components of the transmission, such as disk packs of the planetary gear set. Heat-generating components in the form of friction disk packs (e.g., clutches and brakes of a planetary gear set) have relatively small diameter friction disks and annular channels formed between consecutive separator plates for annular springs, which force separation of the disk pack when not energized, and thereby facilitate coolant flow through the interleaved components of the disk pack. The enhanced cooling improves the operation life of these components and the overall operability of the transmission.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that any use of the terms "comprises" and/or "comprising" in this specification specifies the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various implementations other than those explicitly described are within the scope of the claims.

What is claimed is:

1. A disk pack cooling arrangement, comprising:
   a disk pack having alternating first and second plates in which one or more first plates are configured to couple to a first machine component and one or more second plates are configured to couple to a second machine component that is rotatable with respect to the first machine component, each first plate being of a radial dimension less than each second plate so that one or more annular channels exist radially outward of each first plate; and
   one or more annular springs each disposed in an associated one of the one or more annular channels about a circumference of an associated one of the one or more annular springs;
   wherein each annular spring is configured to apply a separating force to at least one second plate and to form one or more flow channels for cooling fluid to reach each first plate from the associated annular channel.

2. The arrangement of claim 1, wherein each first plate is a friction disk and each second plate is a separator plate.

3. The arrangement of claim 1, wherein each annular spring is spaced radially from an associated one of the first plates.

4. The arrangement of claim 1, further including one or more pilot members substantially radially centering each annular spring with respect to a rotation axis.

5. The arrangement of claim 4, wherein there are a plurality of pilot members angularly spaced about the rotation axis; and
   wherein an outer periphery of each annular spring contacts at least one of the pilot members.

6. The arrangement of claim 5, wherein the pilot members are dowel pins.

7. The arrangement of claim 6, wherein the dowel pins fit through openings in each second plate.

8. The arrangement of claim 7, wherein the disk pack includes a third plate at each axial side of the alternating first and second plates; and
   wherein the dowel pins connect to the third plates.

9. The arrangement of claim 1, wherein each annular spring is one of a wave spring and a Belleville spring.

10. A disk pack cooling arrangement, comprising:
    a disk pack having alternating friction disks and separator plates in which the friction disks are configured to couple to a rotating member extending along a rotation axis and are of a radial dimension less than the separator plates to form a plurality of annular channels radially outward of the friction disks; and
    a plurality of annular springs each disposed about a circumference of an associated one of the friction disks in an associated one of the annular channels;
    wherein the annular springs are configured to apply a separating force to the separator plates and to form flow channels for cooling fluid to reach the friction disks from the annular channels.

11. The arrangement of claim 10, wherein each annular spring is spaced radially from the associated friction disk.

12. The arrangement of claim 10, further including one or more pilot members substantially radially centering each annular spring with respect to the rotation axis.

13. The arrangement of claim 12, wherein there are a plurality of pilot members angularly spaced about the rotation axis; and
    wherein an outer periphery of each annular spring contacts at least one of the pilot members.

14. The arrangement of claim 13, wherein the pilot members are dowel pins fit through openings in the separator plates.

15. The arrangement of claim 14, wherein the disk pack includes a backing plate at each axial side of the alternating friction disks and separator plates; and
    wherein the dowel pins connect to the backing plates.

16. The arrangement of claim 10, wherein each annular spring is one of a wave spring and a Belleville spring.

17. A transmission assembly, comprising:
    a housing having one or more walls at least in part defining an internal cavity containing a rotating member and defining one or more coolant passages;
    at least one disk pack within the internal cavity of the housing, the at least one disk pack having a set of friction disks and a set of separator plates interleaved with the set of friction disks, the friction disks being coupled to the rotating member and the separator plates being coupled to the housing, and the friction disks being of a radial dimension less than the separator disks to form a plurality of annular channels radially outward of the friction disks; and
    annular springs each disposed about a circumference of an associated one of the friction disks in an associated one of the annular channels, the annular springs being configured to apply a separating force to the separator plates and to form flow channels for cooling fluid to reach the friction disks through the annular channels from the one or more coolant passages.

18. The transmission assembly of claim 17, further including one or more pilot members substantially radially centering each annular spring with respect to the rotation axis.

19. The transmission assembly of claim 18, wherein there are a plurality of pilot members angularly spaced about the rotation axis; and
    wherein an outer periphery of each annular spring contacts at least one of the pilot members.

20. The transmission assembly of claim 19, wherein the at least one disk pack includes a backing plate at each axial side of the alternating friction disks and separator plates; and
    wherein the pilot members connect to the backing plates.

* * * * *